May 9, 1944. S. G. BRADY 2,348,281
MACHINE FOR GRINDING RACKS
Filed Aug. 10, 1942  5 Sheets-Sheet 1

INVENTOR.
SAMUEL G. BRADY
BY
*Whittemore Hulbert & Belknap*
ATTORNEYS

May 9, 1944.　　　　S. G. BRADY　　　　2,348,281
MACHINE FOR GRINDING RACKS
Filed Aug. 10, 1942　　　5 Sheets-Sheet 2

INVENTOR.
SAMUEL G. BRADY
BY
Whittemore Hulbert + Belknap
ATTORNEYS

May 9, 1944. S. G. BRADY 2,348,281
MACHINE FOR GRINDING RACKS
Filed Aug. 10, 1942 5 Sheets-Sheet 3
FIG. 3.
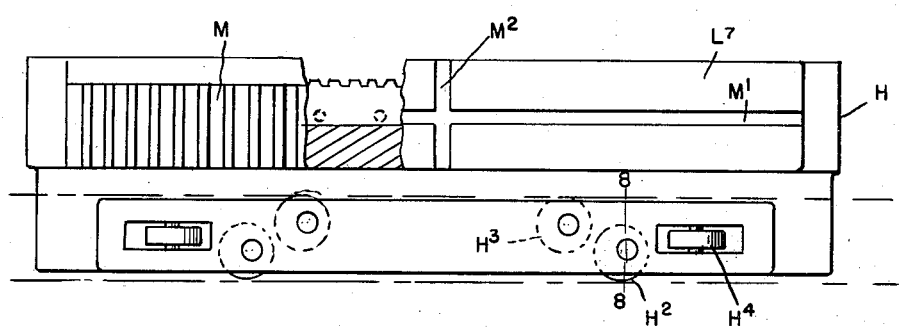
FIG. 4.
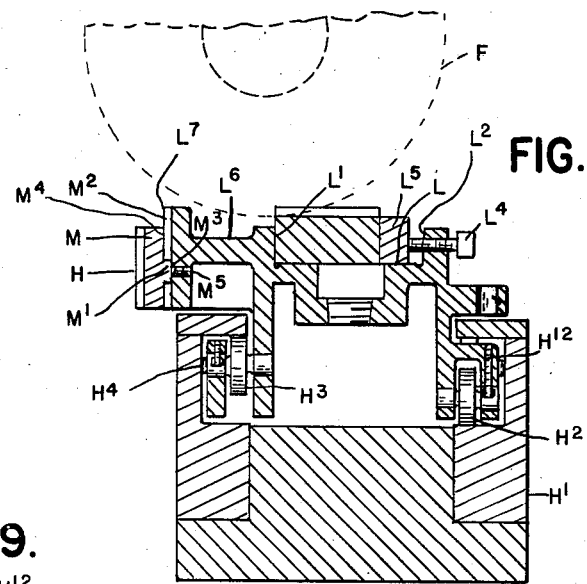
FIG. 9.
FIG. 8.
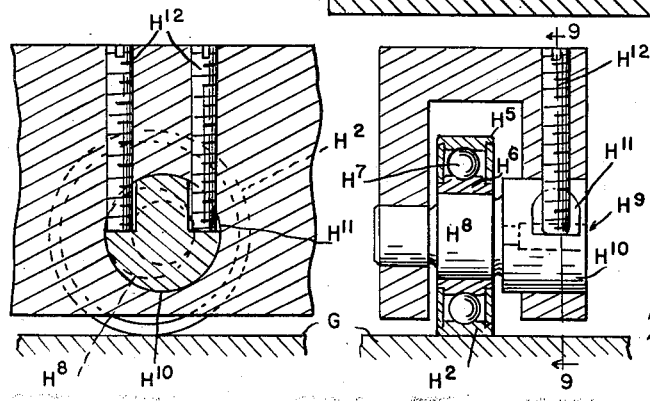
INVENTOR.
SAMUEL G. BRADY
BY Whittemore Hulbert Belknap
ATTORNEYS May 9, 1944.　　　S. G. BRADY　　　2,348,281
MACHINE FOR GRINDING RACKS
Filed Aug. 10, 1942　　　5 Sheets-Sheet 4
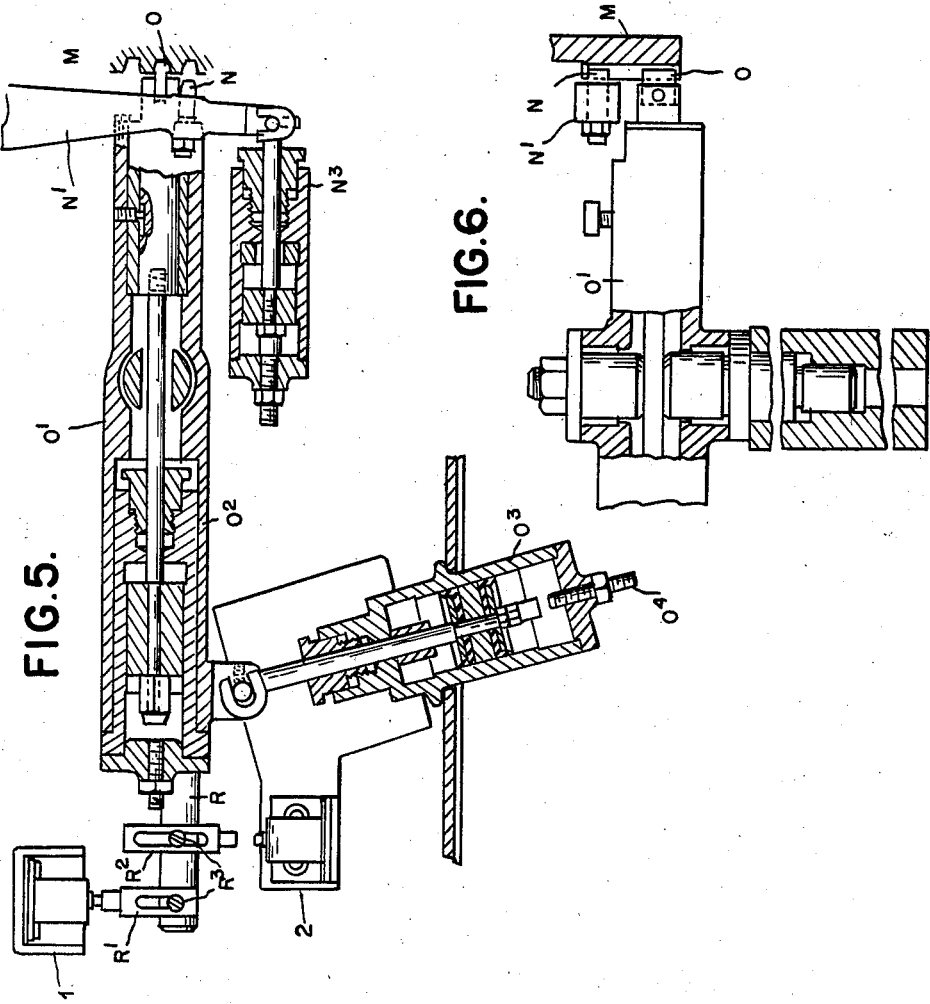
INVENTOR.
SAMUEL G. BRADY May 9, 1944.  S. G. BRADY  2,348,281
MACHINE FOR GRINDING RACKS
Filed Aug. 10, 1942  5 Sheets-Sheet 5

INVENTOR.
SAMUEL G. BRADY
BY
Whittemore Hulbert+Belknap
ATTORNEYS

Patented May 9, 1944

2,348,281

UNITED STATES PATENT OFFICE 2,348,281

MACHINE FOR GRINDING RACKS

Samuel G. Brady, Royal Oak, Mich., assignor to The Gear Grinding Machine Company, Hamtramck, Mich., a corporation of Michigan Application August 10, 1942, Serial No. 454,307

6 Claims. (Cl. 51—92)

The invention relates to the manufacture of racks in which the finished contour is produced by form grinding.

It is the object of the invention to obtain a machine capable of grinding within certain limits racks of all forms and dimensions and to impart thereto a high degree of accuracy. To this end the invention consists in the construction as hereinafter set forth.

In the drawings:

Figure 3 is a side elevation of the work holding carriage with its track;

Figure 4 is a cross section through the carriage and track;

Figure 5 is a sectional plan view of the indexing mechanism;

Figure 6 is a sectional side elevation of a portion thereof;

Figure 8 is an enlarged section on line 8—8, Figure 3; and

Figure 9 is a section on line 9—9, Figure 8.

General description

Generally described, my improved machine comprises a relatively reciprocating form grinder wheel and work supporting table, together with a transversely movable carriage, a work holder thereon, and indexing mechanism for periodically advancing said carriage to successive grinding positions. There is also a swing table mounted on the work supporting table which carries the transverse carriage and indexing mechanism and which is capable of being set at various angles to the direction of reciprocation with respect to the grinder wheel. The actuation and timing of the mechanism is preferably accomplished by the use of hydraulic motors and electromagnetic control mechanism so that when the machine is once set, the grinding may proceed automatically.

Figure 1:
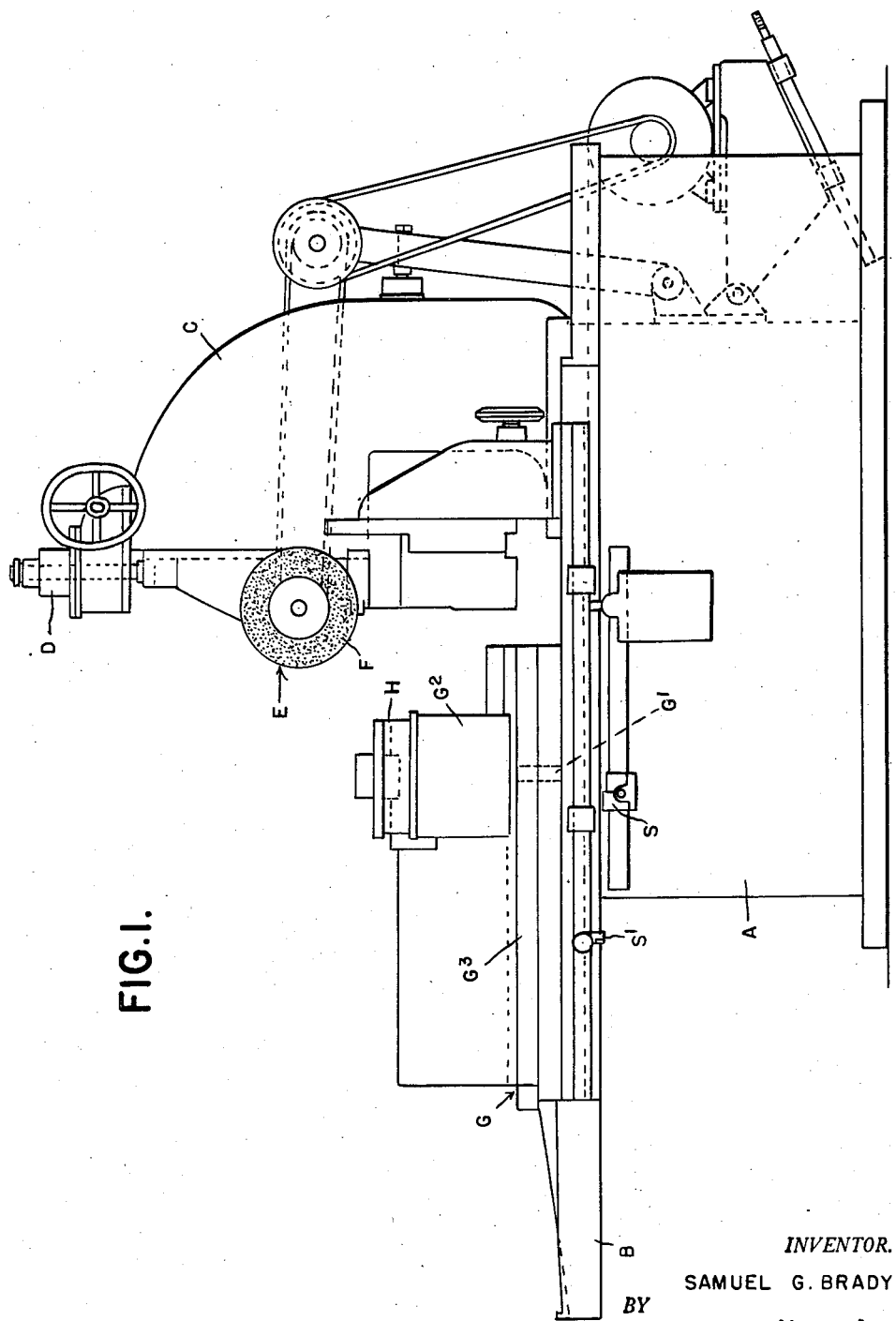
Figure 1 is a side elevation of the machine.
Figure 2:
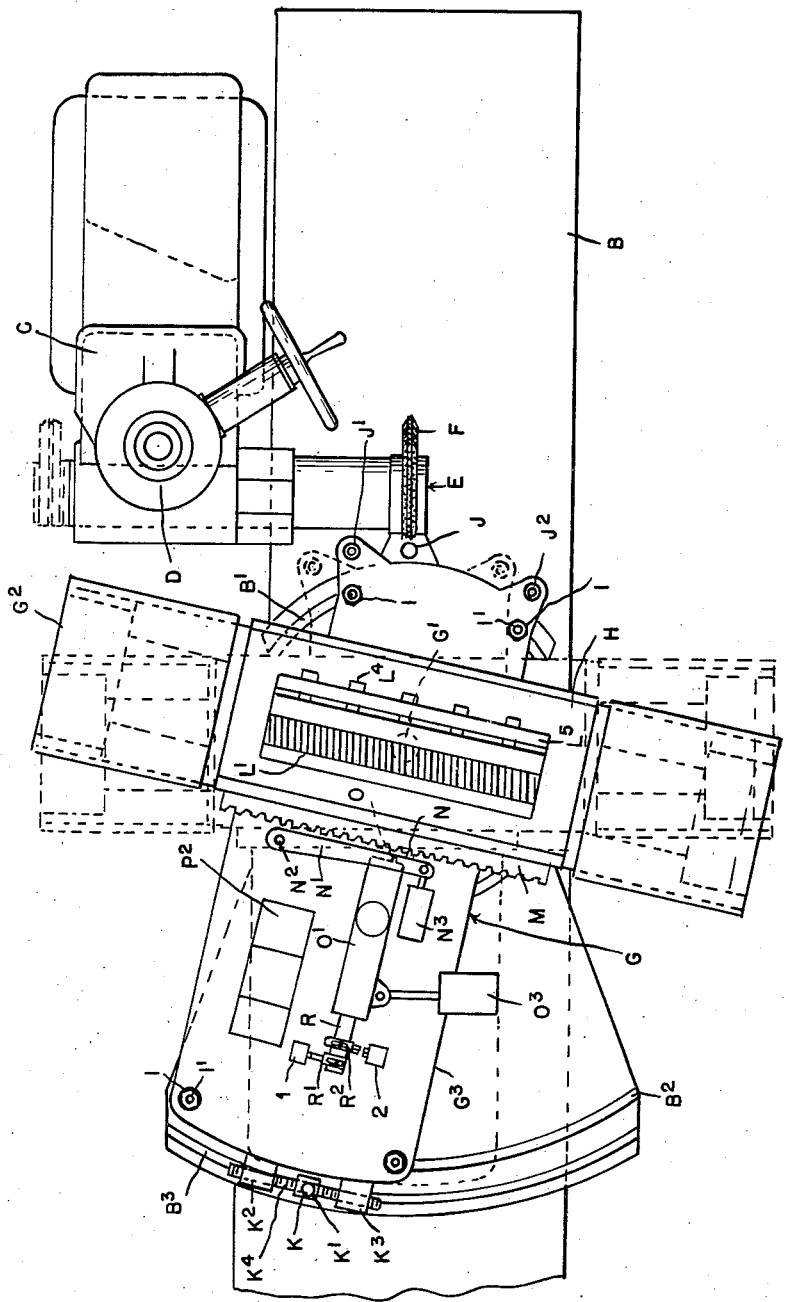
Figure 2 is a plan view of a portion of the machine.

As shown in Figure 1, A is the supporting frame or bed; B is the table mounted for longitudinal reciprocation thereon; C is a post or bracket arm rising from the base at one side of the table; D is a head vertically adjustably secured on the post C; E is the grinding arbor; and F the formed grinder wheel. Upon the table B is mounted a swing table G angularly adjustable about a center post or pin G'. This swing table is preferably of a substantially T-shaped form, the headed portion $G^2$ of which constitutes a guideway for a transversely movable carriage H, while the stem portion $G^3$ of the T forms a shelf on which is supported the indexing mechanism.

The table B is provided with arcuate undercut grooves B' and $B^2$ which are concentric to the pivot G'. Clamping bolts I having their heads engaging said undercut grooves pass through apertures in the table G and are provided with nuts I' through which the table G may be rigidly clamped in any position of adjustment upon the table B.

For facilitating the setting of the table G at an exact angle with respect to the direction of reciprocation of the table B, a post J projects upward from the table B, and pins J' and $J^2$ are secured to the table G on opposite sides of said post. These pins and the post are exactly positioned so that when the measurement between the post and each of the pins is the same, the T head $G^2$ will extend at right angles to the direction of movement of the carriage B. On the other hand, to set the head $G^2$ at any other angle with respect to the direction of movement of the carriage B, this may also be accomplished by exact measurement of the spaces between the post J and the respective pins J', $J^2$.

To further facilitate the setting of the angle of the table G a stop K is adjustably secured to the bed B by a headed clamping bolt K' engaging an undercut arcuate groove $B^3$ in the bed B, concentric with the pivot G'. This stop is arranged between lugs $K^2$ and $K^3$ projecting from the portion $G^3$, and screws $K^4$ engaging said lugs and bearing against the stop K after the latter has been clamped may be adjusted to accurately determine the angular position of the table G.

Work carriage

The mounting of the carriage H for transverse movement on the table G comprises guide rails H' on the table and roller bearing wheels $H^2$, $H^3$ and $H^4$ for engaging said rails. These roller bearings preferably comprise inner and outer concentric race members $H^5$ and $H^6$ and balls $H^7$ therebetween. The inner race member is mounted on an eccentric portion $H^8$ of a pin $H^9$ rotatably secured in the walls of the carriage. Each pin $H^9$ has a circular head portion $H^{10}$ provided with recesses $H^{11}$ on opposite sides thereof. Adjusting screws $H^{12}$ engaging shoulders formed by said recesses form a means of rotatably adjusting the pin and locking it in its adjusted position. The pins are so located that the wheels $H^2$ engage a lower horizontal track on the rails $H'$. The wheels $H^3$ engage an upper horizontal track on said rails, and the wheels $H^4$ revolve in a horizontal plane and engage the side surfaces of the opposite rails. Thus, the travel of the carriage on the track is accomplished with a minimum of friction. Also, by rotatably adjusting the pins $H^9$ by means of the screws $H^{12}$ the wheels may be very accurately set in planes parallel to the longitudinal axis of the carriage.

Work holder

The carriage H has formed in its upper portion a recess for receiving the rack to be ground, said recess having a bottom face L and parallel side faces $L'$ and $L^2$. The rack to be ground is placed in this recess and is clamped by means of a series of screws $L^4$ passing through threaded apertures in the side $L^2$. Preferably a filler strip $L^5$ is placed between the screws and the rack. The faces L and $L'$ are exactly parallel to the corresponding faces of the guide rails so that the direction of movement of the carriage will be parallel to the longitudinal axis of the rack. The carriage is also provided with a bracket $L^6$ having a vertical face portion $L^7$ forming a mounting for exchangeable master racks M. This face is provided with horizontal and vertical splineways $M'$ and $M^2$ for engaging corresponding splines $M^3$ and $M^4$ on the master rack, thereby holding said rack in exact parallelism with the rack to be ground. Screws $M^5$ detachably secure the master rack in position.

Indexing mechanism

The indexing mechanism is mounted upon the shelf $G^3$ of the swing table and therefore remain in operative relation to the master rack and carriage in all positions of angular adjustment thereof.

The essential elements of the indexing mechanism are the master rack, a locking dog for holding said rack and carriage from movement during the grinding operation, and an oscillatory pawl member for advancing the rack and carriage to successive index positions. The dog N is a wedge-shaped member mounted on a rock arm $N'$ which is pivoted on a post $N^2$ rising from the shelf $G^3$. The outer end of the rock arm $N'$ is connected to a hydraulic piston motor $N^3$ which when actuated moves the dog into or out of engagement with the master rack. The pawl O is in the form of a gear tooth for meshing engagement with the master rack, said pawl being slidably mounted upon a rock lever $O'$ and moved into and out of engagement with the rack by a hydraulic motor $O^2$, also mounted on the lever.

The rock lever is actuated by a hydraulic motor $O^3$ to advance the pawl O the required amount for one indexing operation. An adjustable stop $O^4$ limiting the stroke of the motor $O^3$ determines the exact distance of movement in each reciprocation of the lever. Thus, by properly controlling and timing the operation of the hydraulic motors $N^3$, $O^2$ and $O^3$, the master rack together with the carriage will be successively advanced from one index position to another and will be rigidly locked in each position by the dog N.

Control means for indexing mechanism

For controlling and timing the operation of the hydraulic motors just described, I preferably employ mechanically and electromagnetically actuated valves, as follows:

P is a valve mechanically actuated by a dog on the reciprocating table when the latter is in a position where the work is withdrawn from the grinder. This valve supplies hydraulic fluid to a reversing valve $P'$ from which it is conducted to the hydraulic motor $O^3$. The reversing valve $P'$ is held in one position by a spring Q, and in its opposite position by a solenoid $Q'$ whenever the latter is energized. Hydraulic fluid is also supplied from the pressure line to an electromagnetically operated reversing valve $P^2$ which controls the operation of the motors $O^2$ and $N^3$. The valve $P^2$ is actuated in one direction by a solenoid $Q^2$, and in the opposite direction by a solenoid $Q^3$, these being respectively controlled by electric closing switches 1 and 2 arranged on opposite sides of an extension R of the rock lever $O'$. On this extension are laterally adjustably mounted pusher members $R'$ and $R^2$ adapted to actuate the respective switches 1 and 2. Inasmuch, however, as the amplitude of the rocking movement of the lever $O'$ is changed for indexing with different master racks, these pusher members are adjustably mounted on the extension R. As shown, this adjustable mounting comprises clamping screws $R^3$ passing through slots in the members $R'$, $R^2$ and engaging the member R. The switches 1 and 2 are of a character which permits of operation by a very slight movement of the actuating member, such for instance as one-thousandth of an inch. Thus when the members $R'$ and $R^2$ are properly adjusted, the rock lever $O'$ will substantially complete its movement in either direction before operating the respective switches.

A reversing switch $Q^4$ is arranged in the electric circuits so that the control of the solenoids $Q^2$ and $Q^3$ by the switches 1 and 2 may be reversed. The circuit of the solenoid $Q'$ contains a switch $Q^5$ which, when closed, energizes said solenoid to hold the valve in one position while, as before stated, the spring Q holds the switch in the opposite position when the solenoid is deenergized.

Operation of the indexing mechanism

The sequence of events in the operation of the indexing mechanism is as follows:

When at rest, as during the grinding period, the locking dog N is in engagement with the master rack M to hold the carriage H stationary. Oil under pressure is in each of the hydraulic motors but there is no movement thereof. Assuming that the direction of movement of the carriage during indexing operations is to the right, the rock lever $O'$ stands in the position shown in Fig. 7. In such position the pusher member $R'$ has engaged the switch 1 to close the same and energize the solenoid $Q^2$, the switch 2 remaining open and the solenoid $Q'$ being deenergized. The electric reversing switch $Q^4$ is in the position shown in full lines (Fig. 7).

Figure 7:
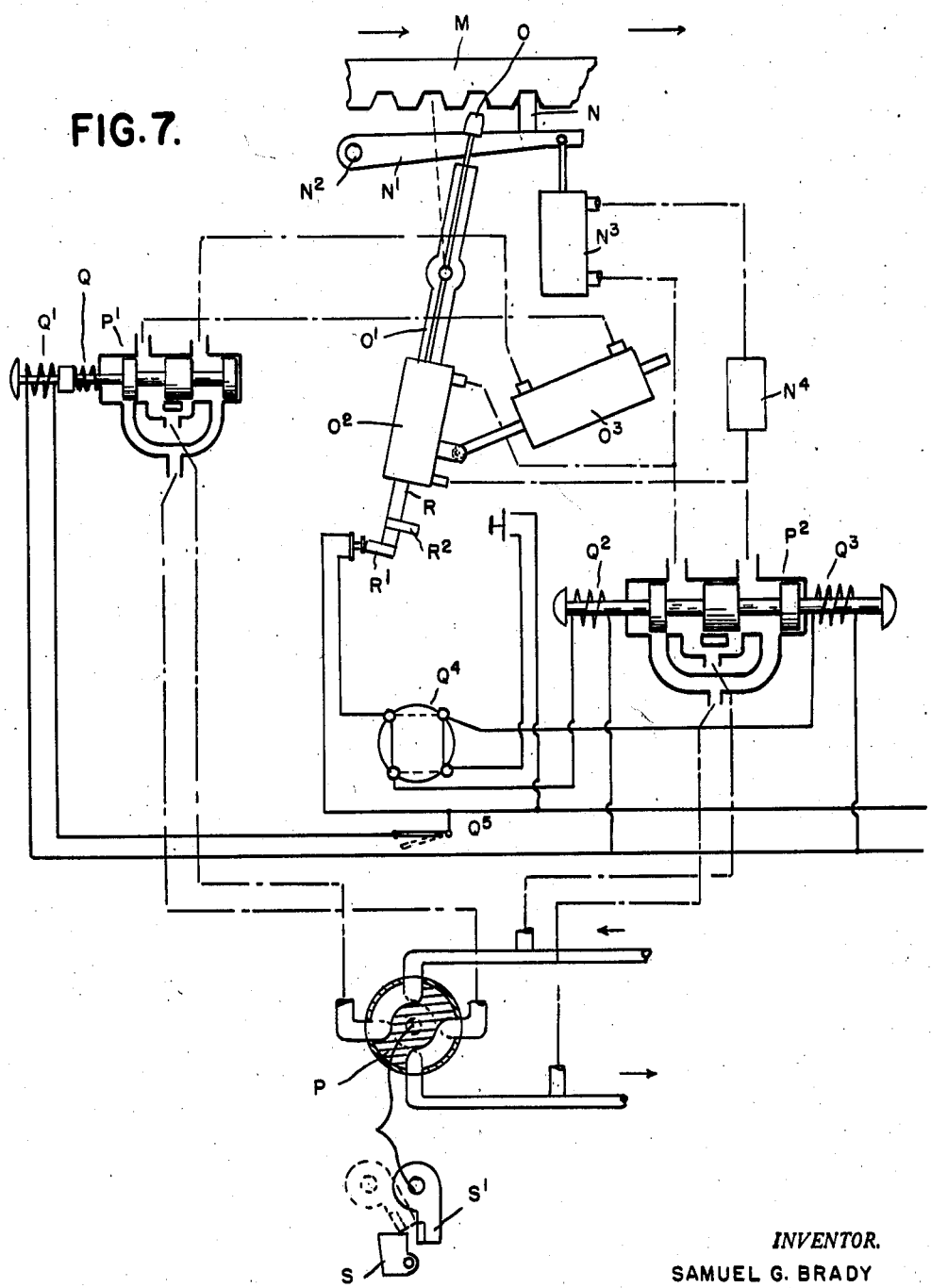
Figure 7 is a diagram illustrating the hydraulic and electrical connections to the indexing mechanism, the hydraulic conduits being illustrated in broken lines.

When the table moves to withdraw the work from engagement with the grinder wheel, a dog S thereon engages a lever arm $S'$ connected to the stem of the rotary valve P and actuates said valve into the position shown in dotted lines (Fig. 7). This causes oil to flow from the valve P through the valve $P'$ to the left end (Fig. 7) of the hydraulic motor $O^3$, actuating the same to rock the lever $O'$ into the position shown in dotted lines. This will register the pawl O with another gash in the master rack M.

Also the movement of the lever and its extension R opens the switch 1 to deenergize the solenoid $Q^2$ and at the completion of the movement of the lever closes the switch 2 to energize the solenoid $Q^3$. This reverses the valve $P^2$ causing it to deliver oil to the lower end of the motor $O^2$, thereby moving the pawl O upward into engagement with the rack. Oil is also delivered from the valve $P^2$ to the upper end of the motor $N^3$ so as to actuate the same to withdraw the dog N from its engagement with the rack. Such movement is, however, delayed by a flow-restricting means $N^4$ placed in the delivery line between the valve $P^2$ and the upper end of the motor $N^3$. Thus the pawl will be fully engaged with the rack before the dog N is withdrawn therefrom.

During the interval in which the above described events are occurring the dog S is in engagement with the lever S', holding the valve P in the position shown in dotted lines (Fig. 7). A further movement of the table withdraws the dog from said lever, whereupon the valve P is actuated by a spring (not shown) to its reverse position, shown in full lines (Fig. 7). This causes oil to flow through the valve P' to the right-hand end of the motor $O^3$, causing the actuation thereof and the rocking of the lever O' a distance approximately equal to the circular pitch of the master rack. This distance is determined by the position of a stop $O^4$ in said motor $O^3$, which stop, as shown, is a screw-threaded rod that may be adjusted when necessary. As a result of the movement of the lever O' the switch 2 is opened and the switch 1 is closed, thereby deenergizing the solenoid $Q^3$ and energizing the solenoid $Q^2$. Thus the valve P is returned to its original position causing the motor $N^3$ to reengage the dog N with the rack M. As the dog N is of a wedge-shaped form, its reengagement will exactly complete the indexing movement.

*General operation of the machine*

To adjust the machine for the grinding of racks of a particular construction, the swing table G is first adjusted to correspond to the angle of the rack teeth, this being accomplished as previously described. A master rack corresponding in circular pitch to that of the work to be ground is then selected and mounted on the carriage H. The carriage is initially in a position where the holding dog of the indexing mechanism engages the master rack at one end thereof. The work is clamped in the work holder on the carriage and suitably adjusted to register with the grinding wheel. The machine is then set in operation and during each reciprocation of the work table the indexing mechanism will be operated to advance the carriage one tooth of the master rack.

The master rack is somewhat longer than the rack to be ground so that the indexing mechanism is still in engagement therewith after completing the grinding of all of the teeth of the work. The direction of indexing may then be reversed by reversal of the switches $Q^4$ and $Q^5$, which may be either performed manually or, if desired, automatically by the operation of a suitable dog on the table. Thus the grinding may be continued until the work is finished.

One important feature of the construction is that the work carriage is held to an exact rectilinear path of movement, while at the same time such movement is effected with comparatively little frictional resistance. This is accomplished by the roller wheel bearings and the eccentric journal pins therefor, which may be freely adjusted to take up all lost motion and to exert a positive pressure against the track. This insures the performance of the grinding with a high degree of accuracy.

Another important feature is that the electromagnetic reversing valve is operated by an extremely small movement of its actuating member, such for instance as one-thousandths of an inch. This permits of indexing for very small advancements, inasmuch as the oscillatory lever can travel approximately its entire movement before operating the reversing switch. Also the fact that the valve $P^2$ is operated by different solenoids for movement in reverse directions permits said valve to remain stationary after one solenoid is deenergized by the opening of its controlling switch until the other controlling switch is closed to energize the second solenoid.

For simplicity, Fig. 7 shows the switches 1 and 2 directly connected to the solenoids $Q^2$ and $Q^3$, but in actual practice these switches would operate relays for energizing and deenergizing the solenoids.

What I claim as my invention is:

1. In a machine for grinding racks the combination with a main table and a form grinder wheel mounted for relative reciprocation; of a swing table pivotally mounted on said main table, a work holding carriage mounted for transverse movement on said swing table, an exchangeable master rack mounted on said carriage, and indexing mechanism mounted on said swing table for cooperating with said master rack, said indexing mechanism including a locking dog for engagement with the master rack, a rock lever, a pawl on said rock lever movable into and out of engagement with said rack, hydraulic motors for respectively rocking said lever and for moving said pawl and locking dog into and out of engagement with said rack, and timing mechanism controlling the operation of said hydraulic motors whereby said pawl is respectively disengaged from and engaged with said rack during the rocking movement of said lever in opposite directions, and said locking dog is disengaged from said rack during the movement of said lever with the pawl engaged.

2. In a machine for grinding racks including a form grinder wheel, a main table, a swing table and a work holding carriage mounted for transverse movement on said swing table; of indexing mechanism comprising an exchangeable master rack mounted on said carriage, and cooperating means mounted on said swing table including a locking dog, a rock lever, a pawl on said rock lever, hydraulic motors for respectively actuating said pawl and locking dog into and out of engagement with said rack, valves controlling the supply of fluid to said motors, and timed controlling means for said valves whereby said motors are actuated in predetermined sequence.

3. In a machine for grinding racks including a reciprocatory table and a work holding carriage mounted for transverse reciprocation on said table; of an indexing means controlling the movement of said carriage comprising an exchangeable master rack mounted on said carriage, and mechanism mounted on said table including a locking dog for engaging said rack, a rock lever, a pawl carried by said rock lever, a hydraulic motor mounted on said rock lever and connected with said pawl to move the same into and out of engagement with said rack, a hydraulic motor connected to rock said lever a predetermined amount, a hydraulic motor for moving said locking dog into and out of engagement with said rack, reversible valves controlling the supply of fluid to said motors, electromagnetic means for reversing certain of said valves, and switches actuated by the rocking of said lever controlling certain of said electromagnetic reversing means.

4. In a machine for grinding racks the combination with a table and a form grinder wheel mounted for relative reciprocation, and a carriage mounted for transverse movement on said table; of indexing mechanism for successively advancing said carriage including a master rack on said carriage, an oscillatory lever on said table, a pawl on said lever for engagement with and disengagement from said rack, a hydraulic motor for oscillating said lever, a reversible valve controlling said hydraulic motor, electromagnetic means for reversing said valve, and a switch controlling said electromagnetic means operated by a minute movement of said lever whereby a substantially full indexing stroke of said lever is accomplished before reversing of said valve.

5. In a machine for grinding racks the combination with a work holding carriage, of an indexing mechanism therefor including an oscillatory lever, a hydraulic motor for oscillating said lever, an adjustable stop limiting the movement of said hydraulic motor to determine the amplitude of oscillation, a reversing valve controlling said hydraulic motor, electromagnetic means for reversing said valve, a switch controlling said electromagnetic means operated by a minute movement, a member on said oscillatory lever for actuating said switch adjustable in relation to the adjustment of said stop whereby a substantially full indexing stroke of said lever is accomplished before reversal thereof.

6. In a machine for grinding racks the combination with a work holding carriage, of an indexing mechanism therefor including an exchangeable master rack on said carriage, an oscillatory lever, a pawl carried by said lever for actuating said rack, a locking dog for normally holding said rack against movement, hydraulic motors for respectively oscillating said lever engaging and disengaging said pawl and engaging and disengaging said dog, means controlling the operation of said hydraulic motors in predetermined sequence including a reversible valve controlling the motor for oscillating said lever, a reversible valve controlling the motors for respectively actuating said pawl and said locking dog, electromagnetic means for operating the last mentioned reversing valve, electric switches for controlling said electromagnetic means located to be actuated by said lever at opposite ends of its oscillatory movement, said switches being adapted to be actuated by minute movements of said lever thereby permitting a substantially complete oscillation thereof before reversal of said valve.

SAMUEL G. BRADY.